United States Patent [19]
Sullivan

[11] 3,767,888
[45] Oct. 23, 1973

[54] AIR WIRE ELECTRODE FOR STAINLESS STEEL WELDING

[75] Inventor: Cornelius J. Sullivan, Berkeley Heights, N.J.

[73] Assignee: Airco, Inc., New Providence, N.J.

[22] Filed: Apr. 29, 1971

[21] Appl. No.: 138,790

Related U.S. Application Data

[63] Continuation of Ser. No. 31,638, April 24, 1970, abandoned.

[52] U.S. Cl. .................................. 219/146, 219/137
[51] Int. Cl. ............................................ B23k 35/22
[58] Field of Search .................. 219/137, 145, 146, 219/74; 117/202–207; 148/24, 26

[56] References Cited
UNITED STATES PATENTS

| 3,585,352 | 6/1971 | Zvanut | 219/146 |
| 3,415,976 | 12/1968 | Smith | 219/146 |
| 3,177,340 | 4/1965 | Danhier | 219/146 |
| 3,534,390 | 10/1970 | Woods et al. | 219/146 |

FOREIGN PATENTS OR APPLICATIONS

| 1,160,069 | 7/1969 | Great Britain | 219/146 |
| 1,030,326 | 5/1966 | Great Britain | 219/146 |

Primary Examiner—J. V. Truhe
Assistant Examiner—George A. Montanye
Attorney—Larry R. Cassett, Edmund W. Bopp and H. Hume Mathews

[57] ABSTRACT

An air wire electrode comprising an outer sheath of mild steel having a central core constituting about 50 percent by weight of the electrode; the core being composed of stainless steel alloying ingredients and components of a lime-rutile-fluorspar flux system for gasless slag-shielding, the lime being present as part of a prefused lime-rutile mixture of suitable proportions, including the eutectic and stoichiometric compositions.

12 Claims, 3 Drawing Figures

PATENTED OCT 23 1973 3,767,888

INVENTOR
CORNELIUS J. SULLIVAN
BY Larry R. Cassett
ATTORNEY

AIR WIRE ELECTRODE FOR STAINLESS STEEL WELDING

This application is a continuation of my application Ser. No. 31,638, filed Apr. 24, 1970, now abandoned.

BACKGROUND OF THE INVENTION

The advantages of arc welding alloy steels by welding machines having means for automatically feeding a continuous wire electrode to the welding arc are well known. With this technique, the welding can be precisely controlled and the welding speed increased by using a flexible bare wire electrode composed of an outer sheath (usually of mild steel for facilitating reduction and consolidation of the wire by drawing) with a central core containing alloying and fluxing materials. However, in such operations auxiliary shielding of the arc and weld metal from the atmosphere is usually required for preventing contamination of the weld metal by oxides, nitrogen, etc. Conventional gas shielding using carbon dioxide, argon, etc., as well as slag-shielding (submerged arc) are commonly used for this purpose.

Although various welding techniques have been proposed for using cored electrodes without auxiliary shielding, such have in general been limited to the welding of mild steel. Insofar as is known, cored electrodes for welding steels of higher alloy content have required for all practical purposes, auxiliary shielding accompanied by greater cost and complexity.

For avoiding auxiliary shielding in stainless steel welding which requires comparatively large amounts of alloying ingredients, so-called "stick electrodes" with a self-contained fluxing system have been used. In this instance, a mild-steel wire constituting the electrode core is coated with a somewhat brittle composition of alloying and fluxing materials proportioned for supplying essential alloying chromium, nickel, etc., together with fluxing components, for shielding the weld metal during arc deposition. However, the self-contained stick electrode is made up in comparatively rigid, short lengths, is uneconomical, and cannot be used in automatic welding machines where continuous feeding of the electrode is required.

In welding operations other than for stainless steel, a so-called "air wire" can sometimes be used without auxiliary shielding where the steel sheath provides core volume sufficient for limited amounts of alloying ingredients and flux components. However, for welding stainless steel of standard composition the required alloying amounts of chromium and nickel especially, are quite large; consequently, for usual wire sizes the mechanical properties of the resulting thin mild-steel sheath have been found to be incompatible with a core of sufficient volume to accommodate both the alloying ingredients and a complete self-contained flux system.

Attempts to combine the advantageous features of the continuous bare wire cored-electrode with those of the self-contained stick electrode for stainless steel welding, have heretofore been unsuccessful, due primarily to the problem of making a workable cored-wire electrode of required composition that is practical for continuous feed in an automatic welding machine. This problem is further aggravated by the mechanical characteristics of the steel sheath as regards wire forming and drawing; that is, if the wire sheath itself contains material amounts of chromium and nickel the resulting composition introduces serious problems in the reduction and consolidation of the wire in the drawing process. For this reason, air wire electrodes having an outer sheath of stainless steel or the like, are not considered practical.

Hence, the invention is primarily concerned with an improved technique whereby a cored-electrode with mild steel sheath and self-contained fluxing system can be successfully used in automatic machines without any auxiliary shielding for welding stainless steel.

SUMMARY OF THE INVENTION

In accordance with the invention, a cored, air wire electrode capable of use in automatic welding machines for stainless steel welding is composed of an outer sheath or tube of mild steel and an inner central core of alloying ingredients and fluxing materials, the latter constituting a self-contained-fluxing system. The core per se is approximately equal in weight to the sheath, and for a preferred composition includes in percentage of core weight, alloying ingredients 62.80 (39.15 chromium, 18.40 nickel, ferro-alloys including 3.30 manganese and 1.90 ferrosilicon, with 0.05 pollucite for arc stabilization) and a lime-rutile-fluorspar fluxing system, 37.20, that is characterized by compactness and gas-less slag shielding.

For achieving a compact, low volume flux system, a prefused lime-rutile mixture (that in the stoichimetric mixture constitutes calcium titanate) is used for supplying the lime content of the fluxing and slag-forming combination. The fluxing system is comprised of 3 to 15 percent lime, 35 to 83 percent rutile and 10 to 60 percent fluorspar, and in the preferred form of the invention, the composition lies within the rutile-rich area of the $CaO-TiO_2-CaF_2$ ternary liquidus diagram. The fluxing system components listed above and hereinafter throughout the application, are specified in percentage by weight of the flux fill in the electrode core.

In practice as used in automatic welding machines, the stainless steel air wire electrodes of the invention are capable of making sound stainless steel welds without any auxiliary shielding, and without undercutting or excessive spatter; also, the shielding slag is easily removed from the weld.

A principal object of the invention therefore is an improved cored air wire electrode for welding stainless steel that can be used in automatic welding machines for low-cost continuous welding without auxiliary shielding.

A further object is a new self-contained fluxing system for stainless steel cored wire electrodes that does not require an intrusion of the wire sheath for proper fusing during the welding process.

Another and related object is an improved air wire electrode of the character described above, wherein the essential alloying ingredients for stainless steel, together with components of a complete self-contained lime-rutile-fluorspar fluxing and slag-shielding system are combined in the electrode core, for making up about one-half the electrode weight and wherein the core is sheathed by a mild steel tube mechanically suited for use of the wire electrode in conventional automatic welding machines.

Other objects, features and advantages will appear from the following description with reference to the accompanying drawings.

DESCRIPTION OF PREFERRED EMBODIMENT

Figure 1:
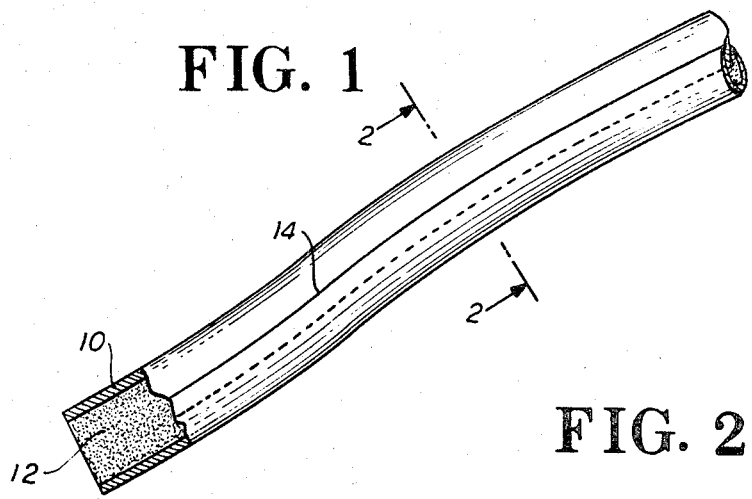
FIG. 1 is a view, partly in section, of the cored, air wire electrode with self-contained flux system embodying the invention.
Figure 2:
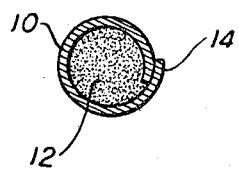
FIG. 2 is a cross-sectional view taken along the line 2—2 of FIG. 1.

The stainless steel air-wire electrode of the invention shown enlarged in FIGS. 1 and 2, is of the so-called "cored-electrode" type and comprises an outer sheath or tube 10 of mild steel and an inner, centrally disposed core or "fill" 12 composed of the essential alloying ingredients and fluxing components, the latter making up a complete and self-contained fluxing and slag-shielding system.

It is recognized that cored electrodes having a mild steel sheath are limited as to the weight ratio between core and electrode. Where a core-fill of about 50 percent is desired, i.e. wherein the core weight approximates the sheath weight, the sheath thickness is so reduced that further reduction in thickness tends toward mechanical fabrication and handling problems. As the total alloy contant by weight of electrodes for stainless steels amounts to 30 percent to 35 percent, e.g., at 50 percent electrode fill, the alloying ingredients in the core would constitute 60 percent to 70 percent of the core by weight, it will be apparent that further addition to the core of a complete fluxing and slag shielding system necessarily involves a new approach to the problem of providing sufficient fill without excessively weakening the sheath. Using a stainless steel sheathing has been proposed, but this is impractical as the sheathing tends to gall during wire drawing, etc. Ordinarily acceptable flux systems and core sheathing, such as a fluoride-based system tied-in for fusing purposes with a W-shaped mild steel sheathing for welding low alloy steels, cannot be used for stainless steel welding due to the restricted fill space imposed by the sheath intrusion or similar internal partitions, etc. In the case of a cored electrode having an ordinary tubular sheathing, the core or fill often contains calcium carbonate for supplying the lime component of a flux system. However, calcium carbonate is gas-forming under welding conditions and tends to decompose and expel the heated end of the core from the sheath. Calcium oxide per se (lime) cannot of course be used as such in the core, due to its hygroscopic character.

It was discovered in developing the invention that calcium titanate ($CaO \cdot TiO_2$) could be advantageously adapted for low volume use in a gas-free, slag-shielding fluxing system of the lime-rutile-fluorspar type. The flux system is in this instance compounded of $CaO \cdot TiO_2$ with additional $TiO_2$ as required, and $CaF_2$. The calcium titanate was found to be well adapted for use in a gasless flux system as it is free of the disadvantages inherent in calcium carbonate and lime as described above, and is suitable for slag forming; it also provides a low volume component that is compatible with all parts of the fill.

Calcium titanate composed of 59 percent CaO and 41 percent $TiO_2$ by weight occurs in the U.S.S.R. as a natural mineral, perovskite, but is not readily available as such. An available commercial product is in the form of a fluffy powder that is unsuitable per se because of its poor handling qualities for the core filling process.

It was subsequently found that lime and rutile could be prepared in a more practical form as a prefused mixture. To this end, a mixture of 81 pounds rutile and 19 pounds pebble lime (the eutectic composition) was charged in small increments into a laboratory arc furnace and melted at a low average power rate. The fused product was subsequently chilled, crushed and ground to −40 mesh, +200 mesh, and then mixed in the desired fill proportions with fluorspar and additional rutile, as required. In a second furnace run, calcium titanate was satisfactorily produced with a mixture of 59 pounds rutile and 41 pounds lime (the stoichiometric calcium titanate mixture). In the wire tests listed herein, prefused mixtures including the eutectic mixture described above (which melts at 2,660°F as compared with 3,560°F for the stoichiometric mixture), were used in compounding the respective fluxes for the wire fill.

The flux fill according to the invention is composed of 3 to 15 percent lime, 35 to 83 percent rutile, and 10 to 60 percent fluorspar, the prefused mixture including all the lime and at least part of the rutile.

Fabrication of the cored wire may follow conventional practice wherein the fluxing materials in granular or powder form are fed from a blender onto a mild steel strip that is passed through a forming mill. Preferably, the mill shapes the sheath around the fill as a tube with an overlapping edge for preventing flux leakage. The tube is then drawn to the desired wire diameter, such as 0.110 inch for the present example, with average wall thickness of 0.0108 inch. For improved fabrication, the strip used should have a width-to-thickness ratio of approximately 50 to 1, and should be closed at a diameter approximately 30 percent larger than the desired final diameter, with allowance made for an overlap of three-eighths to one-half the diameter. For making the test wires, AISI 1010 strip, 0.594 inch × 0.012 inch, was used; no difficulty was experienced in achieving the desired core fill range of about 49 percent to 52 percent by weight of the electrode. With this fill range, alloy recovery in the weld metal has been found sufficiently good so that the alloy content may be made leaner, if desired, thereby providing for increased flux volume of slag formers.

Figure 3:
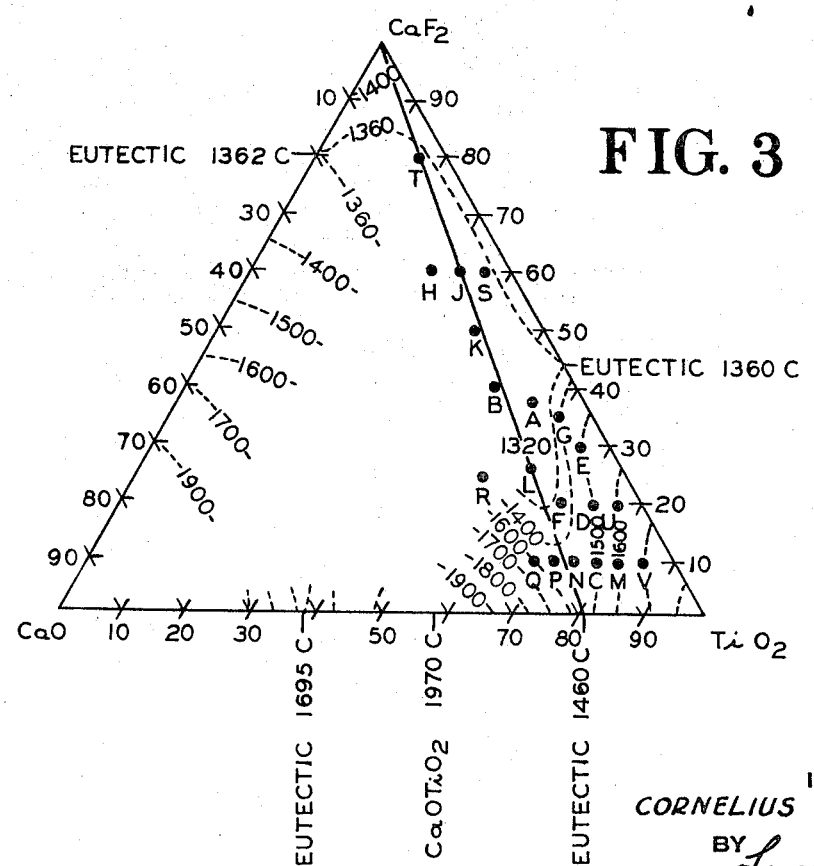
FIG. 3 is a ternary liquidus diagram for graphically illustrating preferred compositions of the self-contained flux system.

For considering the composition of the fluxing system constituting part of the fill, reference is made to the CaO, $TiO_2$ and $CaF_2$ ternary liquidus diagram of FIG. 3. This diagram although incomplete as to locations of all liquidus isotherms, is however sufficiently accurate in the region most relevant to the invention, i.e. the area between the $CaF_2$-$TiO_2$ binary line and the $CaF_2$-$TiO_2$ eutectic section, for present purposes. A number of test wires were made in accordance with the invention as hereinafter described, and it was found that relatively spatter-free, sound welds with friable, easily removed slag can be produced, using a number of formulations of the new flux system within the rutile-rich composition area.

In the following tables the compositions of the test wires used, and the characteristics of the welds produced are listed for a better understanding of the invention.

TABLE I — WIRE CORE FILL

| Ingredient | Percent in Core by Weight |
| --- | --- |

| | |
|---|---|
| Manganese | 3.30 |
| Ferrosilicon | 1.90 |
| Chromium | 39.15 |
| Nickel | 18.40 |
| Pollucite* | 0.05 |
| Fluorspar | 62.80 |
| Rutile | 37.20 |
| Calcium titanate | |

Flux total

*48% by weight Cs₂O (added for arc stabilization)

For test purposes, concentrations of all alloying ingredients and pollucite were kept constant at the total value shown, and the total flux content was maintained at 37.20 percent of the fill notwithstanding individual variations in content of lime, rutile and fluorspar for respective flux systems.

In the first series of tests a comparatively large number of wires having widely different fluxing compositions, were made for studying the characteristics of fillet welds produced thereby; Table II is a listing of results.

The fill for the wires listed above (which ranged from 48 to 55 percent) had a flux system containing the commercially available fluffy calcium titanate mentioned above. As calcium titanate in the fluffy form did not readily lend itself to even flow of the fill on the forming mill, the wires of Tables I and II were for testing purposes floodfilled in 9 ft. lengths; also, for providing maximum fill volume the cylindrical sheaths were butted at the edges, rather than overlapped as shown in FIG. 2. The overlapped edge however is preferred as it precludes flux leakage at the seam.

Reference is now made to the flux compositions of and the physical characteristics of the weld deposits produced by the test wires of Table II. From inspection of FIG. 3, it will be seen that flux compositions of the indicated test wires located in the rutile-rich corner of the ternary diagram produced the best results, i.e. wires such as C, F and M for example, having flux compositions in the predominately rutile area, all produced sound welds with very good bead shapes, no undercutting, easy slag removal and minimum spatter; however, wire V deep in the rutile corner produced a weld with full length center-line crack. Flux compositions ranging further toward the lime corner, as in wires P and Q resulted in welds with gross porosity, whereas compositions toward the fluoride corner as in wires A and S for example, resulted in increased spatter, undercut, slumping of the weld, even though the beads themselves were sound.

Thus, the flux compositions lying approximately within a region roughly bordered by the test-wire points A, L, F, C and D may for practical purposes, be considered a preferred group having in percentage by weight of the flux system, lime 7 to 14, rutile 55 to 82 and fluorspar 10 to 40.

For further investigation and analysis of the deposited weld metal, additional wires of the A, C, F, and S flux formulations were made in continuous lengths by a forming mill. The prefused ground eutectic material previously described was used (instead of the fluffy calcium titanate) in compounding these fluxes, and the wires in this instance were formed from 0.594 in. × 0.012 in. AISI 1010 overlapping strip as illustrated in FIG. 2. The wires were drawn to final diameter of 0.110 in. with average wall thickness of 0.0108 in. No difficulty was experienced in attaining the aforesaid desired fill range of 49 to 52 percent using conventional hopper feed.

TABLE II.—HORIZONTAL FILLET WELDS

| Wire | Flux fill by weight | | | Fillet shape | Undercut | Spatter | Slag removal | Soundness |
|---|---|---|---|---|---|---|---|---|
| | CaO (percent) | TiO₂ (percent) | CaF₂ (percent) | | | | | |
| A | 8 | 55 | 37 | Convex | Slight | Light | F¹ | S. |
| B | 12 | 48 | 40 | do | Yes | Light/moderate | F¹ | S. |
| C | 12 | 78 | 10 | E | No | Light | E | S. |
| D | 8 | 72 | 20 | CST | Slight | Moderate | F¹ | S. |
| E | 4 | 66 | 30 | Convex | do | Heavy | F¹ | S. |
| F | 12 | 68 | 20 | CST | No | Light/moderate | E | S. |
| G | 5 | 60 | 35 | CSP | Yes | Moderate/heavy | F¹ | S. |
| H | 12 | 28 | 60 | CSP | Yes | Moderate | P¹ | S. |
| J | 8 | 32 | 60 | CSP | Yes | Moderate/heavy | P¹ | S. |
| K | 10 | 40 | 50 | CSP | Yes | Light/moderate | P¹ | S. |
| L | 14 | 60 | 26 | CST | Slight | Light | G | S. |
| M | 8 | 82 | 10 | G | No | do | G | S. |
| N | 16 | 74 | 10 | Convex | Yes | | P¹ | Porous. |
| P | 19 | 71 | 10 | do | Yes | Moderate | F¹ | Do. |
| Q | 22 | 68 | 10 | CSP | Yes | do | F¹ | Do. |
| R | 23 | 53 | 24 | CSP | Yes | do | F¹ | Do. |
| S | 4 | 36 | 60 | Convex | Slight | do | F¹ | S. |
| T | 4 | 16 | 80 | CSP | No | do | P | S. |
| U | 4 | 76 | 20 | CSP | No | do | F | S. |
| V | 5 | 85 | 10 | CSP | No | do | F | Center-line crack. |

¹ Slag removal good except where locked in by undercut.
NOTE.—E=Excellent; G=Good; F=Fair; P=Poor; S=Sound; CST=Convex, slight; CSP=Convex, slumped.

Horizontal single pass fillets and four-pass weld pads for analysis were made with these wires; all wires were found to produce sound deposits. The horizontal fillets were made at 380 to 400 amps, 33 ½ to 37 volts and 22 ipm travel speed. Weld metal analyses for the horizontal fillets are listed below in Table III, and for the pads in Table IV, with elements in both Tables listed in percent by weight of weld metal.

Table III — WELD METAL ANALYSES (Fillets)

| WIRE | A | C | F | S |
|---|---|---|---|---|
| | % | % | % | % |
| C | 0.045 | 0.053 | 0.052 | 0.050 |
| P | 0.017 | 0.019 | 0.020 | 0.017 |
| S | 0.017 | 0.027 | 0.025 | 0.020 |
| Si | 0.60 | 0.42 | 0.45 | 0.59 |
| Mn | 1.37 | 1.42 | 1.62 | 1.65 |
| Ni | 10.68 | 12.25 | 11.70 | 11.38 |
| Cr | 19.65 | 22.80 | 20.90 | 20.40 |
| Mo | 0.12 | 1.00 | 0.17 | 0.12 |
| Cb | under 0.10 | under 0.10 | 0.43 | under 0.10 |
| Ti | 0.12 | 0.14 | 0.10 | 0.21 |

Wire F on AISI 347 base plate (0.84% Cb, 0.27% Mo, etc.)
Wires A and S on AISI 321 base plate (0.44% Ti, 0.13% Mo, etc.)
Wire C on AISI 316 base plate (17.3% Cr, 12.5% Ni, 2.35% Mo, etc.)

All deposits were normal except that wire C had excessive fill, thus accounting for the comparatively high nickel and chromium contents.

Table IV WELD METAL ANALYSES (Pads, Multipass)

| WIRE | A | C | F | S |
|------|------|------|------|------|
|      | %    | %    | %    | %    |
| C    | 0.052 | 0.053 | 0.055 | 0.046 |
| P    | 0.016 | 0.017 | 0.016 | 0.016 |
| S    | 0.024 | 0.024 | 0.022 | 0.024 |
| Si   | 0.31 | 0.39 | 0.40 | 0.33 |
| Mn   | 1.41 | 1.66 | 1.49 | 1.59 |
| Ni   | 10.72 | 12.63 | 11.50 | 11.12 |
| Cr   | 20.56 | 25.12 | 21.50 | 21.40 |
| Mo   | 0.28 | 0.25 | 0.31 | 0.26 |
| Cb   | 0.18 | 0.19 | 0.20 | 0.16 |
| Ti   | 0.09 | 0.09 | 0.07 | 0.07 |

All deposits on AISI 318 Cb plate (0.82% Cb, 2.00% mo, etc.); all deposits sound.
As in Table III, wire C shows high Ni and Cr contents, due to excessive fill.

Throughout the tests described above, the alloy recovery was much better than expected; in fact, there was no detectable loss for nickel, and loss for chromium was very small. This is an important consideration as it provides for better utilization of the available fill space, especially where an increase in flux content or a heavier sheath as desired, can be achieved in view of the excellent alloy recovery. The weld metal deposited by the wires was sound in both single and multipass operations, all conforming to AWS-ASTM chemical specifications. The all-weld-metal impact properties at temperatures down to −320°F are comparable to published values for coated stickelectrodes and conform to ASME Boiler Code requirements.

As regards the possible extension of application of the present wire to other stainless steel alloys, Tables III and IV show that the total alloy weight content of the deposited metal is approximately between 32 and 33 percent. This clearly indicates that wire of type AISI 316 analysis, for example which typically deposits a total alloy content of 32 percent, is within the scope of the invention; also, other wires which will deposit welds of alloy content comparable to the welds discussed above, can be readily fabricated, as for example those identified as AISI 321 and 347. The extra low carbon grades, such as types 308L and 316L are also feasible where strip with a maximum carbon content of 0.05 percent is used for the sheath. Therefore, in practicing the invention (assuming approximately 50 percent fill), the alloy content in percentage of core weight may consist essentially of about 39 to 41 chromium, 17 to 20 nickel and 3 to 7 ferroalloys.

Having set forth the invention in what is considered to be the best embodiment thereof, it will be understood that changes may be made in the compositions and apparatus as above set forth without departing from the spirit of the invention or exceeding the scope thereof as defined in the following claims.

What is claimed is:

1. An air wire constituting a cored electrode for arc welding stainless steel comprising:
   a. an outer tubular sheath of mild steel,
   b. the sheath having a core fill constituting by weight about one half of the electrode and including alloying ingredients for stainless steel welding together with components of a self-contained slag-forming flux system consisting essentially of lime, rutile and fluorspar,
   c. the core weight of the combined alloying ingredients being greater than the weight of the remaining core ingredients,
   d. and the flux system by itself producing during arc welding a fluxing medium for substantially completely slag-shielding the weld metal as it is formed.

2. An air wire electrode as specified in claim 1, wherein the flux system is composed by weight of 3 to 15 percent lime, 35 to 83 percent rutile and 10 to 60 percent fluorspar.

3. An air wire electrode as specified in claim 2, wherein the lime, rutile and fluorspar in combination make up about three-eights of the core weight, the remainder being essentially alloying ingredients.

4. An air wire electrode as specified in claim 1, wherein calcium titanate constitutes at least part of the combined lime-rutile content of the flux system, and includes the entire lime component thereof.

5. An air wire electrode as specified in claim 4 wherein the calcium titanate consists of a pre-fused mixture of lime and rutile.

6. An air wire electrode as specified in claim 5, wherein the calcium titanate is a pre-fused eutectic mixture of lime and rutile.

7. An air wire electrode as specified in claim 5, wherein the calcium titanate is a pre-fused stoichiometric mixture of lime and rutile.

8. An air wire electrode as specified in claim 4 wherein the calcium titanate is perovskite.

9. An air wire electrode as specified in claim 1 wherein the alloying ingredients, in percentage of core weight, comprise 39 to 41 chromium, 17 to 20 nickel and 3 to 7 ferroalloys.

10. An air wire electrode as specified in claim 9, wherein the percentages of the alloying ingredients are about 39 percent chromium, 18 ½ percent nickel, and 5 percent ferroalloys.

11. An air wire electrode as specified in claim 4 wherein the lime component is 7 to 14 percent, the rutile component 55 to 82 percent, and the fluorspar component 10 to 40 percent of the flux system by weight.

12. An air wire electrode as specified in claim 3 wherein the core constitutes 48 to 52 percent of the electrode weight, and the sheath consists of mild steel strip formed as a seamed tube with overlapping edge.

* * * * *